2,772,000

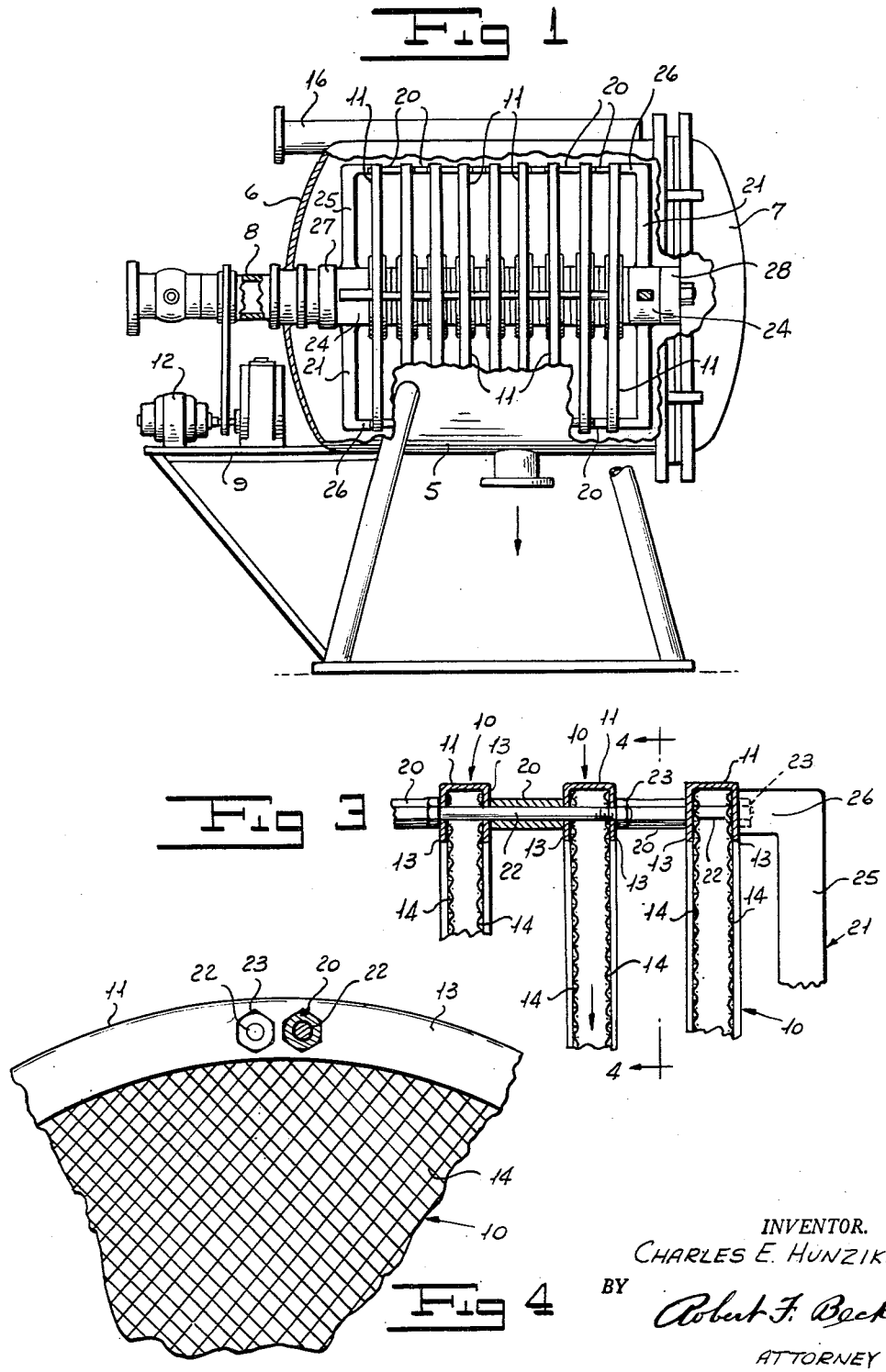
Nov. 27, 1956 — C. E. HUNZIKER — 2,772,000
LEAF ANCHORING MEANS
Filed March 30, 1953 — 2 Sheets-Sheet 1
INVENTOR.
CHARLES E. HUNZIKER
BY Robert F. Beck
ATTORNEY Nov. 27, 1956     C. E. HUNZIKER     2,772,000
LEAF ANCHORING MEANS
Filed March 30, 1953     2 Sheets-Sheet 2
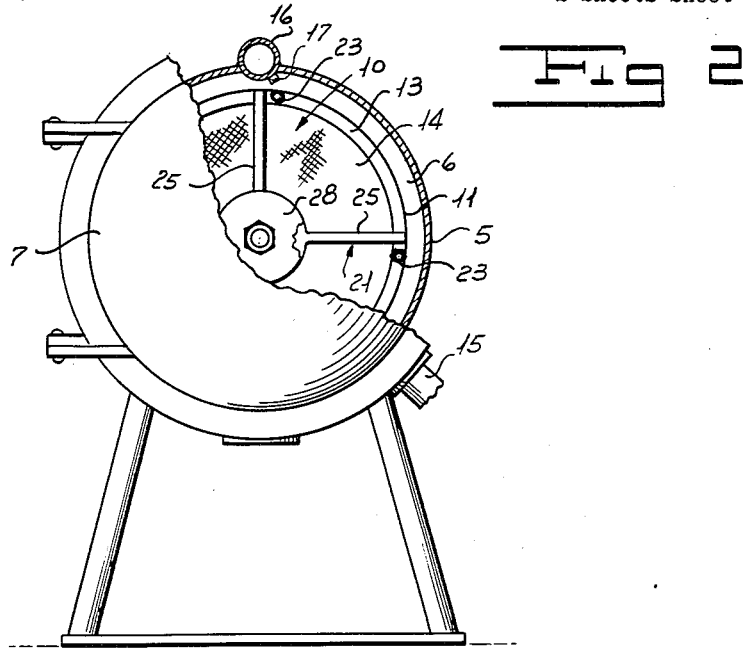
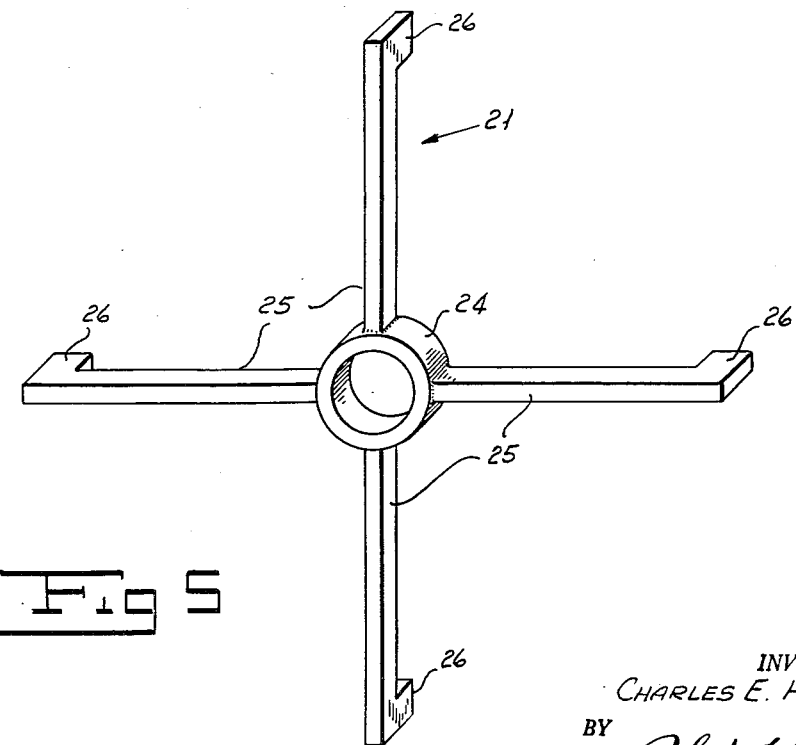
INVENTOR.
CHARLES E. HUNZIKER
BY Robert F. Beck
ATTORNEY

LEAF ANCHORING MEANS

Charles E. Hunziker, Ridgewood, N. J.

Application March 30, 1953, Serial No. 345,298

2 Claims. (Cl. 210—153)

One of the objects of my invention is to provide a pressure leaf filter equipped with anchoring means arranged in conjunction with the filter pack for maintaining and holding the leaves of the pack in uniform spatiality against lateral distortion by operating pressures.

Another object of my invention is to provide means of the foregoing described character which is simple in construction, durable in use, efficient in operation and economical in manufacture.

An important object of my invention is to provide means of the foregoing described character capable of being incorporated in filters already in use without any substantial modification thereof.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a side elevation, partly in section, of a pressure leaf filter having my invention incorporated therein.

Figure 2 is an end elevation, partly in section, of the filter and depicting my invention as applied thereto.

Figure 3 is a fragmentary longitudinal sectional view of the filter pack.

Figure 4 is a detail sectional view taken on the line 4—4 of Figure 3.

Figure 5 is a perspective view of one of the spiders.

In practicing my invention, as illustrated in the drawings, I provide a pressure leaf filter of the rotary leaf type comprising an outer casing or shell 5 mounted above a suitable base, the casing being closed by a wall 6 at one end and provided with a door 7 at the opposite end. Extending into the casing 5 through and suitably mounted in the wall 6, for rotation within the casing, is a hollow shaft 8 drivingly connected to a motor 12 secured to a platform 9 fixed to the outside of the casing. A filter pack is mounted upon the shaft within the casing for rotation by the shaft 8 and is fashioned with a plurality of filter leaves 10, each provided with a peripherial portion 11 formed with side flanges 13 to which the outer ends of the usual screening 14 is secured, as clearly illustrated in Figure 3. The leaves 10 serve to filter fluid introduced into the casing, under pressure, through the inlet 15, it being understood that the leaves are precoated with a suitable filtering medium and that the fluid filtered thereby is forced into the leaves and thence discharged from the leaves through the hollow shaft as is the practice in such constructions. Inasmuch as the leaves and the other foregoing described components are of ordinary construction, and form no part of the present invention per se, a more detailed description thereof is not deemed necessary.

As is customary in the operation of filters of the foregoing described character, the screening 14 of the leaves is periodically cleaned by rotating the pack within the casing and spraying liquid, from a header 16, carried by the casing, onto the screening. The liquid is discharged from the header by suitable spray nozzles 17 arranged to direct the sprays in a predetermined manner onto the leaves. To preclude lateral distortion of and damage to the leaves by spraying or filtering pressures and maintain the efficiency of the spraying, I provide stabilizing or anchoring means for the leaves.

The stabilizing or anchoring means comprises a plurality of tubular members or cylindrical spacers 20 and a pair of end members or spiders 21. The spacers 20 are disposed in circumjacent relation about the leaves and in axially extending rows. Each spacer of each row is interposed between confronting flanges of adjacent leaves in longitudinally staggered relation and secured therebetween and to the adjacent leaves by means of a bolt 22 extending through the respective spacer and flanges of adjacent leaves, the bolt being equipped with a nut 23 as clearly illustrated in Figure 3.

The spiders 21 are each fashioned with a hub 24 fixed to the shaft 8 and from which hub extends radial arms 25 having their outer ends provided with angularly and inwardly extending fingers 26 which engage the outer flanges of the outermost leaves of the pack as depicted in Figure 1 of the drawings. When the spacers and spiders are thus secured in clamped relation with the leaves, lateral distortion of the leaves is precluded.

A sleeve 27 is fixed to the shaft 8 adjacent one of the spiders while a coupling 28 is secured adjacent the other spider and functions to close the shaft and effect clamping of the spiders and pack between the sleeve 27 and coupling 28. By removing the coupling 28, the pack, together with the spiders 21, may be removed from the shaft when desired.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In filtering apparatus having a filter pack adapted to be mounted on a shaft and provided with spaced discal leaves defining open channels therebetween and each leaf having outer marginal lateral flanges extending thereabout, the improvement which comprises a plurality of spacers disposed in circumjacent relation about the leaves and in axially extending rows with the spacers of each row interposed between confronting flanges of adjacent leaves in longitudinally staggered relation, and bolts detachably fixing each of said spacers to the adjacent respective leaves, each of said bolts extending through the flanges of only two leaves and the spacer therebetween, whereby the spatiality of said leaves in said pack is maintained while permitting any one of said leaves to be removed from said pack without disassembling entirely the remaining leaves of said pack.

2. In filtering apparatus having a shaft, and a filter pack mounted on said shaft and provided with spaced discal leaves defining open channels therebetween and each leaf having outer marginal lateral flanges extending thereabout; a plurality of spacers disposed in circumjacent relation about the leaves and in axially extending rows relative to the shaft with the spacers of each row interposed between confronting flanges of adjacent leaves in longitudinally staggered relation, bolts detachably fixing each of said spacers to the adjacent respective leaves, each of said bolts extending through the flanges of only two leaves and the spacer therebetween, and spiders having hubs readily detachably mounted on said shaft adjacent the end leaves of said pack, respectively, said spiders being provided with angularly spaced, radially extending arms fashioned, at their outermost ends, with axially extending fingers frictionally engaging the outermost flanges of said end leaves and cooperating with said spacers to maintain the spatiality of said leaves against lateral distortion and the initial delimitations of said channels whereby to obtain full effectiveness of cleaning fluid sprayed into said channels and onto the lateral faces of said leaves from spray means outside of said pack.

References Cited in the file of this patent

UNITED STATES PATENTS

| | | |
|---|---|---|
| 1,966,274 | Wells | July 10, 1934 |
| 2,073,026 | Renfrew et al. | Mar. 9, 1937 |
| 2,207,618 | Grill et al. | July 9, 1940 |
| 2,278,453 | Kracklauer | Apr. 7, 1942 |
| 2,583,963 | O'Meara | Jan. 27, 1952 |
| 2,655,265 | Little | Oct. 13, 1953 |
| 2,703,177 | Kunstorff | Mar. 1, 1955 |

FOREIGN PATENTS

| | | |
|---|---|---|
| 384,749 | Great Britain | Dec. 15, 1932 |